United States Patent
Yim (10) Patent No.: US 9,317,254 B1
(45) Date of Patent: Apr. 19, 2016

(54) FAULT TOLERANCE MODEL, METHODS, AND APPARATUSES AND THEIR VALIDATION TECHNIQUES

(71) Applicant: GOOGLE INC., Mountain View, CA (US)

(72) Inventor: Keun Soo Yim, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 41 days.

(21) Appl. No.: 14/097,051

(22) Filed: Dec. 4, 2013

(51) Int. Cl.
*G06F 9/44* (2006.01)
*G06F 11/36* (2006.01)

(52) U.S. Cl.
CPC .. *G06F 8/10* (2013.01); *G06F 8/20* (2013.01); *G06F 11/3688* (2013.01)

(58) Field of Classification Search
CPC ................ G06F 8/60–8/68; G06F 8/70–8/78; G06F 11/36–11/3692
USPC .......................................... 717/130, 168–178
See application file for complete search history.

(56) References Cited

U.S. PATENT DOCUMENTS

| | | | | |
|---|---|---|---|---|
| 6,161,219 | A * | 12/2000 | Ramkumar et al. | 717/130 |
| 6,195,795 | B1 * | 2/2001 | Block et al. | 717/101 |
| 6,385,768 | B1 * | 5/2002 | Ziebell | 717/121 |
| 7,024,592 | B1 * | 4/2006 | Voas et al. | 714/47.3 |
| 7,359,865 | B1 * | 4/2008 | Connor | G06Q 40/08 705/7.28 |
| 7,886,289 | B2 * | 2/2011 | Anand | G06F 17/30306 707/600 |
| 7,921,024 | B2 * | 4/2011 | Hogan | G06Q 10/06 705/7.22 |
| 8,271,949 | B2 * | 9/2012 | Bernardini et al. | 717/124 |
| 8,296,445 | B1 * | 10/2012 | Hackborn et al. | 709/228 |
| 8,296,723 | B2 * | 10/2012 | Hanner | G06F 8/10 717/101 |
| 8,332,251 | B1 * | 12/2012 | Morris | G06Q 10/06 705/7.22 |
| 8,660,878 | B2 * | 2/2014 | Bernardini et al. | 705/7.16 |
| 8,667,469 | B2 * | 3/2014 | Bernardini et al. | 717/126 |
| 8,819,617 | B1 * | 8/2014 | Koenig et al. | 717/101 |
| 8,856,169 | B2 * | 10/2014 | Zhang | G06Q 10/06313 705/2 |

(Continued)

OTHER PUBLICATIONS

Intelligent Support for Software Release Planning—Amandeep, Günther Ruhe, University of Calgary, 2500 University Drive NW, Calgary, Canada—Mark Stanford, iGrafx, Corel Inc; Oregon—F. Bomarius and H. Iida (Eds.): PROFES 2004, LNCS 3009, pp. 248-262, 2004.*

(Continued)

*Primary Examiner* — Lewis A Bullock, Jr.
*Assistant Examiner* — Francisco Aponte
(74) *Attorney, Agent, or Firm* — Birch, Stewart, Kolasch & Birch, LLP (57) ABSTRACT

A system and method for fault-tolerant release automation and validation techniques are disclosed. An example method may include receiving release procedures. The release procedures may be defined using a fault-tolerant release automation library. Then, a release program may be created using the release procedures. A release program may be a workflow or a set of nested workflows made up of fault-tolerant release automation procedures. The release program may be executed to test the release procedures. In some embodiments, validation techniques may be used in order to validate and verify that the release procedures are correct and that error detection and recovery capabilities cover all aspects of the release procedures.

26 Claims, 6 Drawing Sheets

(56) References Cited

U.S. PATENT DOCUMENTS

| | | | | |
|---|---|---|---|---|
| 8,874,960 | B1* | 10/2014 | Khan et al. | 714/11 |
| 8,875,093 | B2* | 10/2014 | Balasubramanian | G06F 8/30 717/102 |
| 8,893,074 | B2* | 11/2014 | Horovitz | G06F 8/10 717/100 |
| 2002/0091988 | A1* | 7/2002 | Murphy | 717/101 |
| 2002/0104068 | A1* | 8/2002 | Barrett et al. | 717/104 |
| 2004/0031030 | A1* | 2/2004 | Kidder et al. | 717/172 |
| 2005/0114829 | A1* | 5/2005 | Robin et al. | 717/101 |
| 2005/0216486 | A1* | 9/2005 | Barshefsky et al. | 707/100 |
| 2005/0216879 | A1* | 9/2005 | Ruhe | 717/101 |
| 2006/0047974 | A1* | 3/2006 | Alpern et al. | 713/191 |
| 2006/0271825 | A1* | 11/2006 | Keaffaber et al. | 714/38 |
| 2007/0027934 | A1* | 2/2007 | Roehrle et al. | 707/203 |
| 2007/0169199 | A1* | 7/2007 | Quinnell et al. | 726/25 |
| 2007/0234300 | A1* | 10/2007 | Leake et al. | 717/124 |
| 2007/0239700 | A1* | 10/2007 | Ramachandran | 707/5 |
| 2007/0240154 | A1* | 10/2007 | Gerzymisch et al. | 717/174 |
| 2009/0192849 | A1* | 7/2009 | Hughes | G06F 8/10 705/7.11 |
| 2010/0218058 | A1* | 8/2010 | Somasundaram et al. | 714/724 |
| 2010/0287535 | A1* | 11/2010 | Kim et al. | 717/127 |
| 2011/0289474 | A1* | 11/2011 | Sukhenko et al. | 717/103 |
| 2012/0011455 | A1* | 1/2012 | Subramanian | G06Q 10/06 715/764 |
| 2012/0174089 | A1* | 7/2012 | Milner | 717/172 |
| 2013/0036413 | A1* | 2/2013 | Venkatesan et al. | 717/172 |
| 2013/0061104 | A1* | 3/2013 | Hartl | 714/741 |

OTHER PUBLICATIONS

Supporting the Dynamic Reprioritization of Requirements in Agile Development of Software Products—Zornitza Racheva, Maya Daneva, University of Twente, Netherlands—Luigi Buglione, Ecole de Technologie Supérieure (ETS) / Engineering.IT—2008 Second International Workshop on Software Product Management (ISWPM'08).*

System Dynamics Modeling of Agile Continuous Delivery Process—Olumide Akerele, Muthu Ramachandran, Mark Dixon—School of Computing and Creative Technologies Leeds Metropolitan University Leeds, UK—2013 IEEE.*

Integrating an Agile Process in a Model Driven Architecture—Paloma Cáceres, Francisco Diaz, Esperanza Marcos—Rey Juan Carlos University C/ Tulipán s/n, 28933-Madrid (Spain)—EDAD (07T/0056/2003).*

* cited by examiner

FAULT TOLERANCE MODEL, METHODS, AND APPARATUSES AND THEIR VALIDATION TECHNIQUES

BACKGROUND

Software engineers often use agile development techniques, which include incremental and iterative design and development, to provide new software functionality to end users. Agile development may require fast turn-around between an end user's request for functionality and the delivery of software changes. Additionally, new software may need to be deployed to multiple datacenters since the software may be multi-homed, meaning that the software is designed for large-scale distributed systems and architected to execute from multiple locations simultaneously.

Figure 1:
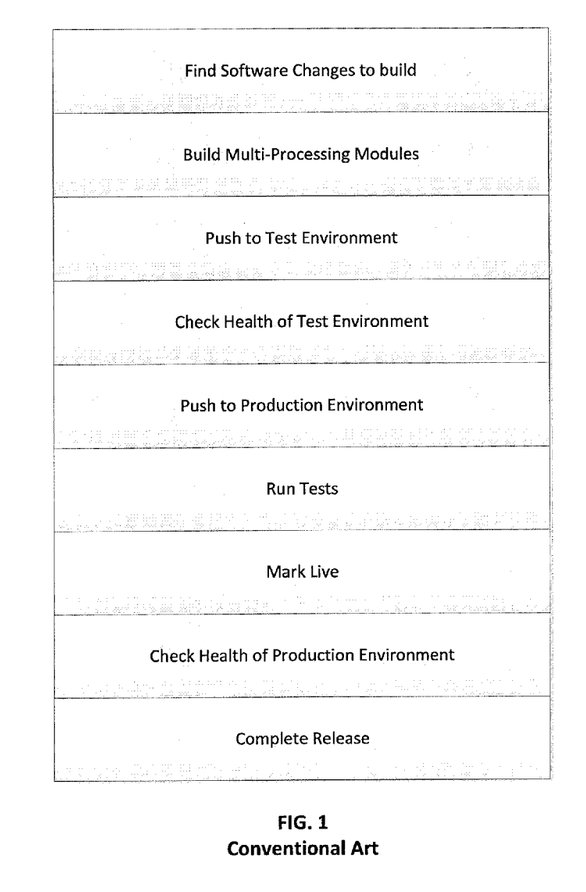
FIG. 1 is an example of conventional release procedures.

Agile development cycles and multi-homed software may create challenges for release engineers who make new software functionality available to end users. Releasing new software is often done manually and can be very time-consuming since release procedures may be complex and software code may be released in multiple locations. For example, as shown in FIG. 1, release procedures may include finding changes to the software and building software with the new changes. The software may then be pushed to a test environment where regression tests may be performed to check for errors. If the software runs in the test environment with no problems, the software may then be moved into a production environment where it can be provided to real end users. After putting the software in production, release engineers may still check the health of the production environment to ensure that the software is functioning properly. There may be several software problems that block the software release including: health check failures; regression test failures; transient software faults; or permanent software faults. If release procedures fail, a release engineer may roll back the process and restart the procedures using previously deployed software packages. Within conventional release workflow processes, it may be difficult to determine where errors occur and how to tolerate them if errors are detected since the workflow may be complex.

An entire release process may take upwards of several hours in order to complete. This time is approximately the time of one engineer fully dedicated to releasing software for two days. If software is being developed using agile techniques, this release process may need to be repeated frequently. Additionally, for multi-homed software, these release procedures may need to be repeated across multiple datacenters in multiple locations. Such repetitions are not always parallelizable because a certain number of replicas may be alive all the time (e.g., a majority if Paxos-based consensus algorithm is used to manage multi-homed software). Therefore, it may be necessary for a software development team to have least one release engineer whose full-time job is to release software.

As recognized by the inventor, in order to manage software releases in an efficient manner, requiring less manual time of release engineers, there should be a workflow framework for release operations that automates release processes and provides fault tolerance to tolerate transient failures at runtime and to make it easier to determine where errors occur.

SUMMARY

This specification describes technologies relating to software release management in general, and specifically to methods and systems for defining reusable release components to create automated release processes that are fault-tolerant.

In general, one aspect of the subject matter described in this specification can be embodied in a system and method for fault-tolerant software release automation. An example system may include one or more processing devices and one or more storage devices storing instructions that, when executed by the one or more processing devices, cause the one or more processing devices to execute an example method. An example method may include: identifying a set of software release procedures; modeling the set of software release procedures and their dependencies using a fault-tolerant release automation library; creating a release program using the modeled software release procedures; and running the created release program.

These and other embodiments can optionally include one or more of the following features. A validation technique may be run to verify the release program. A validation technique may be an end to end test of the release program to verify configuration files used in a release. A validation technique may be a fault injection testing technique that includes: selecting at least one location in a release program where infrastructure failure can occur; determining the time of injection; injecting at least one fault into the selected location at the determined time; and identifying parts of the release program not covered by the release program's error recovery procedures. Email may be sent regarding the created release program's execution. A relative path may be created using prefix or postfix labels to define at least one resource in order to automatically replicate a runtime instance for testing purposes using non-production data. An injected fault may include an injection target, a fault type, and a fault injection time. A modeled set of software release procedures may be a nested directed graph of workflow components, where at least one component represents at least one software release procedure from the set of software release procedures. A validation technique may incrementally validate by only validating newly added components. A workflow may be verified using a nested directed graph of workflow components. Each component may include an operation, a preset, a validation, and a post handler. At least one of the components may represent an error recovery process for another component within the set. Error checking may be run concurrently among components that are not dependent upon one another. Verifying the workflow may include traversing the possible execution paths of the workflow and determining whether the input arguments have been set for each component. Verifying the workflow may include determining whether the failure of any one component results in a single point of failure for the workflow.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

DETAILED DESCRIPTION

According to an example embodiment, a framework can be used to develop automated release workflow programs that detect and tolerate execution failures. An example framework may provide a library, i.e. fault-tolerant release automation procedures application programming interface (FT-RAP API), so that release program developers can quickly and easily develop reusable components that can be combined with other components to produce a nested hierarchy of release workflow procedures.

A typical release workflow requires several steps that may be dependent on the completion of other steps, creating a hierarchy of procedures that should be performed. In order to simplify a release workflow program, release procedures may be broken into subprocesses which may be represented as components. By creating a component-based structure from the workflow process, an example framework may be able to isolate errors and create components that can be reused in several release workflow programs.

Figure 2:
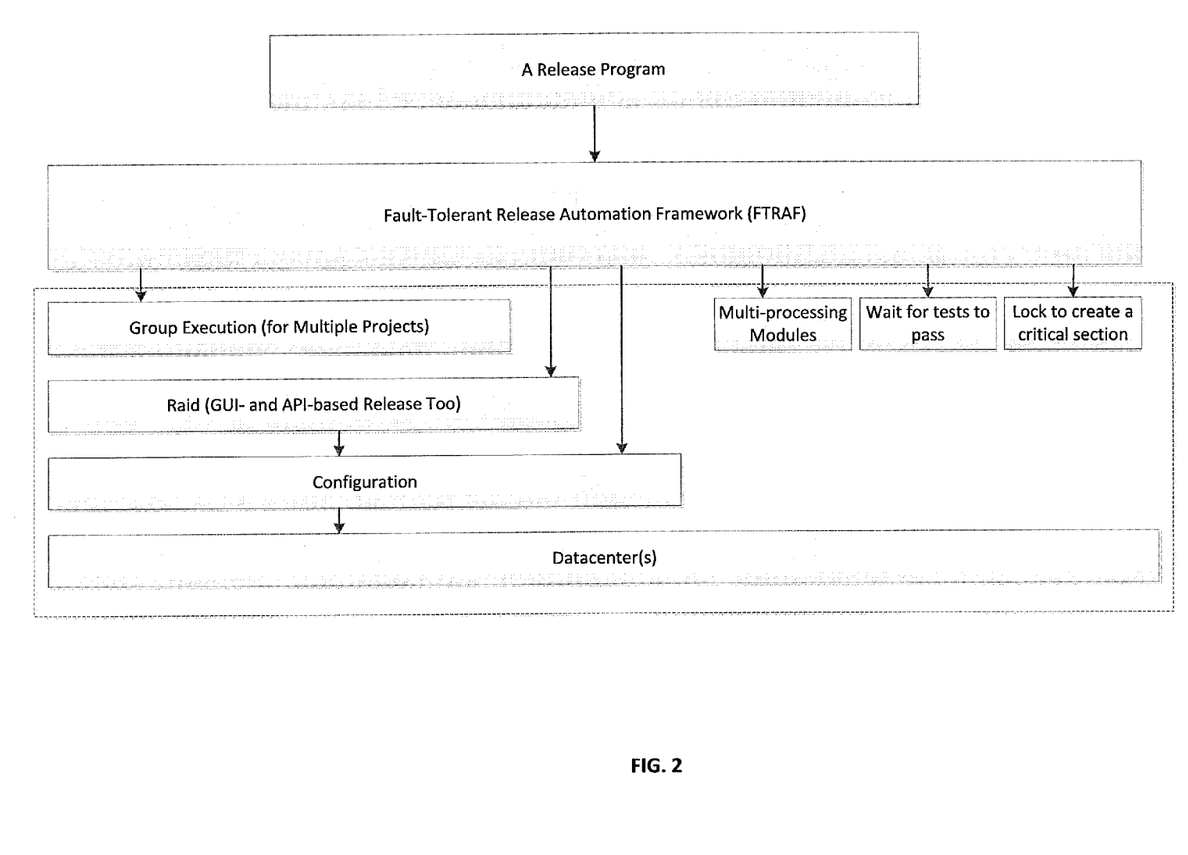
FIG. 2 is a block diagram illustrating elements of an example fault-tolerant release automation framework.

As shown in FIG. 2, an example framework may be logically and/or physically isolated among operations. The framework may use a UNIX process and/or remote procedure calls in order to separate child processes. This isolation may prevent each operation's release errors from propagating to other operations, allowing an example framework to continue running despite operation failures.

Figure 3:
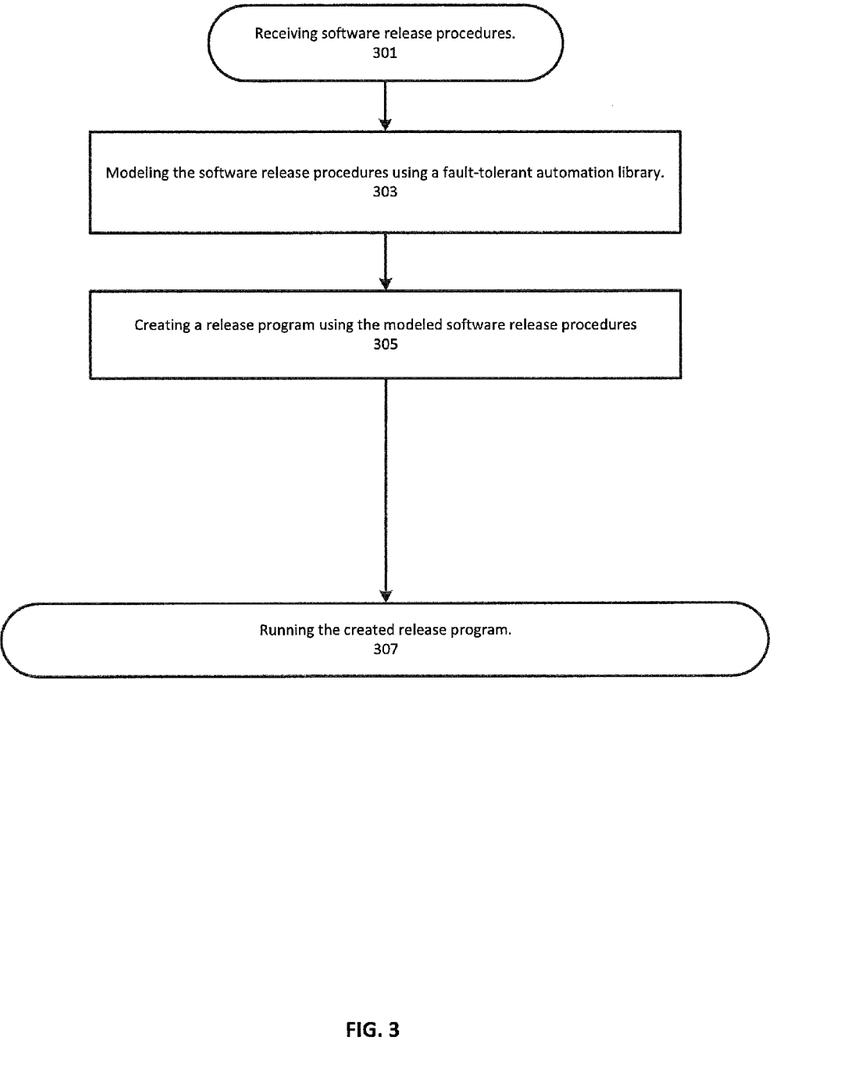
FIG. 3 is a flow diagram illustrating a method for fault-tolerant software release automation.

An example method for creating an automated, fault-tolerant release program may begin with identifying release procedures as shown in FIG. 3 (301). The release procedures and their interactions may be modeled using components, which may be defined by the example framework's fault-tolerant release automation library (303). The release procedures and their dependencies upon one another may be represented as a nested, directed graph of components. A release program may be created from these software release procedures and the created release program may be run in order to perform a software release or test the release procedures. Workflow procedures may be verified using this directed graph, which may be cyclical or acyclical. Workflows may be defined statically. At runtime, they may be built as an in-memory data structure for execution. For workflows, all rules about execution dependencies and input and output value generations may be statically defined in advance. These static definitions may be used to verify certain properties of given workflows. Specifically, an example framework may verify properties including input and termination checking. For input checking, an example framework may traverse the possible execution paths of the given workflows and check that the input arguments of each component are set in advance (e.g. as a global variables, local variables, or directly passed by the component's caller). Since the verification tracks the output values returned by the components, the framework verification may accurately check the release program.

The framework may also check whether there is at least one path which reaches to one of the final exit components of the given workflows where a final exit component is an exit component of the top-level workflow. An example framework may check whether there is at least one path that can be taken for each case that one of the workflow components has failed. If a component fails and there is no path to a final exit component, the component failure may not be tolerated. It may be necessary to inform release engineers of this non-tolerated failure before the release program executes so that the release program can be updated by providing workflow-level error recovery or providing at least one exit component for notification about the failure for manual handling. Verification is provided mainly to help release engineers to easily find defects in the software release program.

Software release may require several operations in order to complete successfully. An example framework may allow for procedures to be modeled and executed in a specific order, creating a release workflow. A release program may be produced using the modeled software release procedures either as a single workflow or as a set of nested workflows (305). The created release program may then be executed (307).

Figure 4:
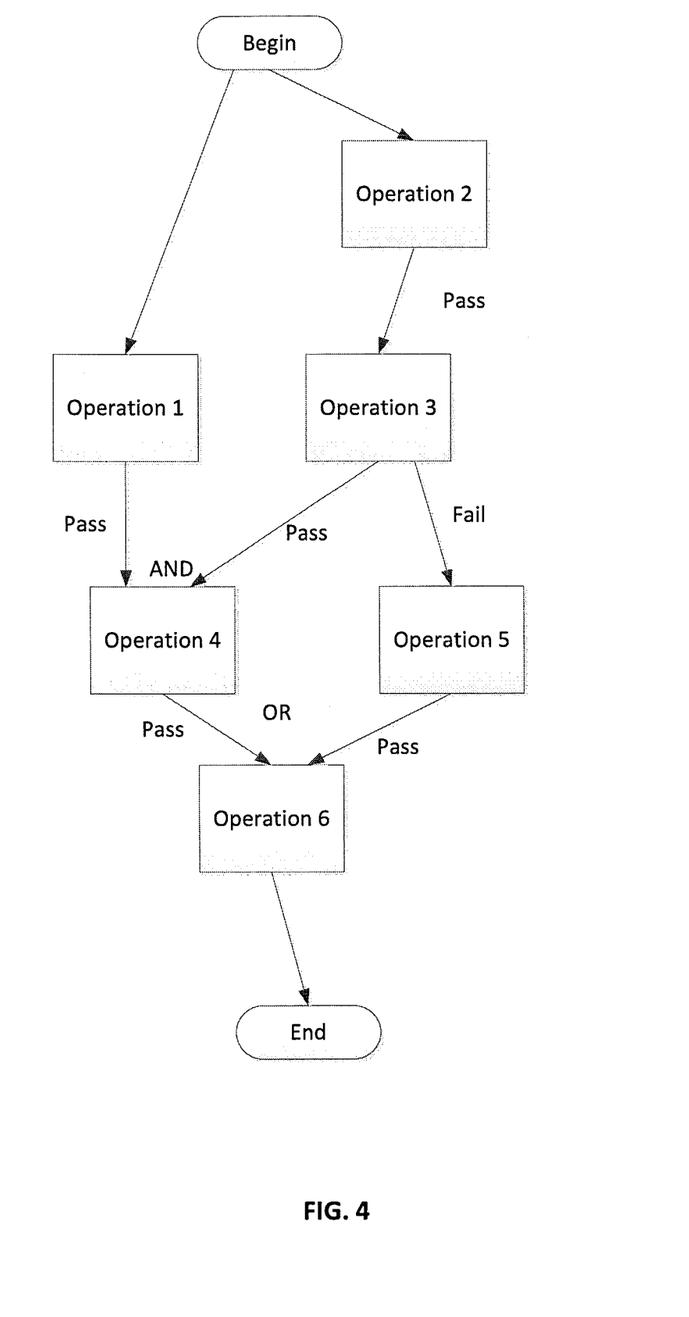
FIG. 4 is an example of a fault-tolerant release automation workflow process.

An example workflow is illustrated in FIG. 4. In order to create the workflow, variables may be defined that are shared among operations. Each operation executor may have a global update key and a local update key to update global and local variables. Global variables may be updated by any executor of a component. However, an executor may only update one global variable and one local variable where a variable can be a complex data structure (e.g., hashmap) containing multiple sub variables. A global update made by an operation executor may be visible to any other operation executor that executes an operation after the update. Two concurrent operation executors may not see the changes made by each other. A local update may only be visible to operation executors that are directly or indirectly called by the operation executor that made the local update. Operation executors may provide results, global update values, or local update values. Global values may be used for input, output, and execution dependencies. Local updates may be used for partial retries and error recovery procedures. An example framework may look in local storage for values when retrying a procedure before trying to find the value in global storage. Global and local values updated by a component may be used to execute subsequent components within the software release workflow.

As shown in FIG. 4, operation execution may be dependent on the successful operation of other operations so operations must be able to understand when an operation has been successfully/unsuccessfully executed through error detection techniques which may define the exact ways to detect successes or failures. Dependencies may be both "AND" and "OR" conditions. For example, as shown the example workflow process illustrated in FIG. 5, Operation 4 is dependent on both Operation 1 and Operation 3 to pass, whereas Operation 6 is dependent on either Operation 4 or Operation 5 to pass. Given this "OR" condition support, failures of some operations may be tolerated. As shown in FIG. 7, Operation 6 may have two execution paths: the successful execution of Operation 3 and the successful execution of Operation 4 or the failed execution of Operation 3 and the successful execution of Operation 5. In this example workflow, the failure of Operation 3 is tolerated.

Workflows may be executed using token-based scheduling. Tokens may be created at the beginning of a workflow process. The tokens may then be passed through every successful and unsuccessful execution within the workflow process. If a token arrives at the end of the workflow process through an expected path, an example framework may conclude that there has been a successful completion of the workflow. If the token does not move or arrives at an unexpected component, there may be a failure in the process. A token in an unsuccessful execution may trigger component designed for error recovery.

Additionally, tokens may be split. For example, as shown in FIG. 4, a token created at the "begin" process may be split between Operation 1 and Operation 2. Additionally, tokens may be merged. As shown in FIG. 4, a token from Operation 1 may be merged with a token from Operation 3 within Operation 4. There should be no cycles within a workflow process.

The middleware of an example framework may include several software features. A sequencer may process operations in workflows of a given automation program by using local or distributed computing resources (e.g. to run operations in parallel). This sequencer may use a sub-process manager to create a child process locally or remotely and run the created child process in isolation where the created child process performs the operation of a component selected for execution. The sub-process manager may use variable storages in order to access both global and local variables. This sub-process manager may also use a parser to parse the values of variables (e.g. component arguments) at runtime in order to pass the parsed variables to the created child process. An example framework may include runtime techniques including isolated execution and checkpoints for the middleware.

At runtime, execution may be done by parsing parameter values and returned values of each component. The parsing may be implemented recursively. The framework may allow a conditional assignment as part of the description of a value. Global and local variables may be inherited by a callee component from a caller component. Only variables that are needed to execute an operation may actually be passed by the middleware. Logically, components may be become similar to independent program binaries, but the components are implemented as one or multiple class methods.

In some embodiments, an example framework may create separate child processes and runtime for each component. If a component crashes, the component may be caught by the middleware (which is the parent process) and the child process may be safely terminated. This process-based logical isolation may be strong in modern computer systems due to the virtual memory and process-enforced protections.

The middleware of an example framework may be designed without any single point of failure. Since the workflow may be fault-tolerant, the framework may be the only point which can become a single point of failure. In order to prevent the framework from being a single point of failure, an example framework may use a checkpointing technique. When a component is executed, the component's execution result (including the return value and execution result) may be stored in permanent storage. If the framework crashes or the workflow fails due to some non-tolerable failures in its operations, the framework may read a checkpoint the next time the framework starts. This checkpoint may be shown to a release engineer so that the release engineer can decide the exact step in the workflow in which to restart the workflow. In some cases, a release engineer may need to manually perform some actions and the framework may be used as a detection or validation mechanism. The workflow may either be resumed or restarted from the beginning. In other cases, a release engineer may need to resume the workflow using the checkpoint because the failure is transient. An example framework may use execution logs to restore local and global variables and update the dependencies properly. A release engineer may need to resume the release program from a specific entry point which is identified and prepared in advance. This entry point may include fault recovery operation or operations to restore runtime states needed for the following operations.

An example framework may allow parallel workflows to be scheduled by considering the available resources. Resources may be heterogenous (either in a single machine or in multiple machines) where each computer node can run up to N numbers of components in parallel. The locality may be maximized by placing similar operations in the same node. When a component is re-executed an example framework may try to run that component in a different computer node since a component failure may be due to some permanent issue (e.g. configuration or hardware) of the node used initially.

Figure 5:
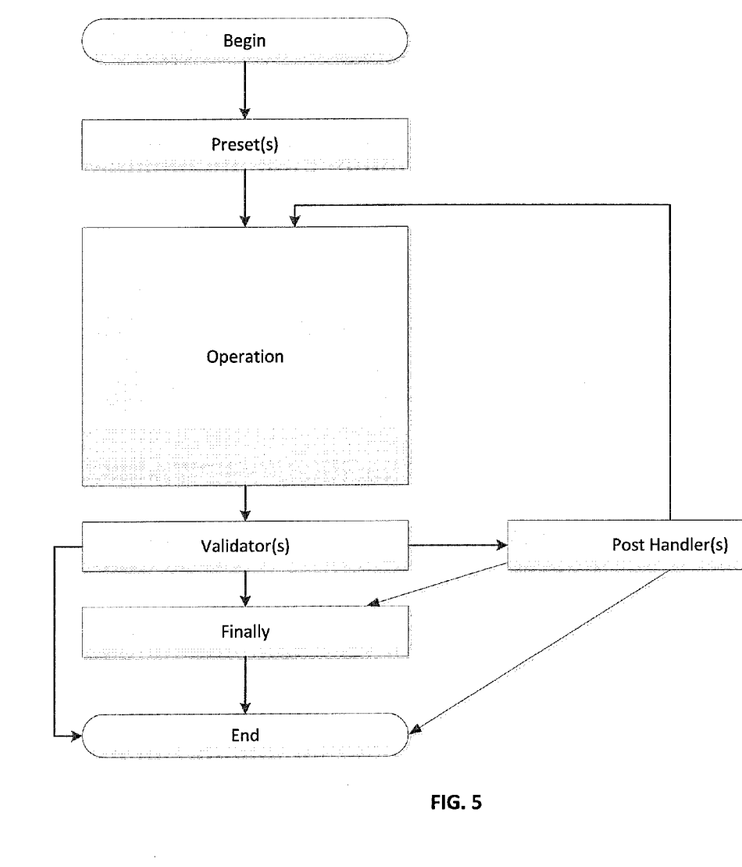
FIG. 5 is a block diagram illustrating a component from an example fault-tolerant release automation framework.

As illustrated in FIG. 5, release procedure components may have attributes including: operations, presets, validators, post handlers, and a finally block.

Operations may be actual procedures performed by the release component. There may be several different types of operations supported by an example framework including: creating a release ID file; reading a release ID file; writing a release ID file; deleting a release ID file; cut passing regression tests; check health; create a release; complete a release; push a release; run tests; check a release ID; check the version of a job running in a datacenter; mark a release live, and send mail.

Prior to executing an operation, a component may use presets to set information that will be used by the operation, such as timeouts, whether email notifications should be sent, where to send email notification, the text of an email notification, and the executor(s) of the operation.

Validators may be used to validate the success or failure of a particular operation's execution. These validators may include error detection and error recovery techniques. To detect errors, validators may check error codes. Error recovery techniques may be used to determine what a component should do once an error occurs. In some embodiments, an operation execution error may require a retry or partial retry of the operation. The error recovery techniques may define the procedures for partial retrying of an operation. A retry parameter may be set to retry operation execution in the event of an operation failure. There may be a maximum limit on the amount of times a particular operation is retried. Additionally, or alternatively, error recovery techniques may define the path of the workflow process once an error has been detected. Since error detection and error recovery may be compartmentalized for each component, an example framework allows for concurrent error checking among workflow processes that are not dependent upon one another.

According to some embodiments, error recovery validators may be separate components and not integrated with specific operations. In order for modularized error recovery to work, error recovery modules must have knowledge of the errors that occur when executing the operation components.

Post handlers within a component may execute after an operation has finished and the operation has been validated, if required. A post handler may fix identified problems before a failed operation is re-executed. Additionally, or alternatively, a post handler may send email regarding the operation execution and provide details about the encountered problems. Components may also optionally include a finally block which may ensure that resources are recovered even if errors occur in the component's execution.

An example framework may allow for the simultaneous control of multiple workflows and/or multiple projects. The framework may also automatically check the health of executing tasks/procedures and continuously tune alerts to improve test coverage. An example framework may also support validation techniques for validating and verifying the release workflow.

In an example embodiment, there may be a validation technique that verifies configurations since many release failures are due to configuration errors. For example, a new task may be added to a production configuration file, but not to the release script, which defines the release workflow. Validation may be added to the FTRAP framework for end to end testing, which performs a release using the latest configuration files in an isolated environment. This validation may use test parameters including labels, release ID files, and mailing lists. An example framework may automatically generate test instance resources to test a release program. For automatic test instance generation, the framework may use different types of input/output resources including: input, permanent runtime, temporary runtime, and output storages. Commonly used resources may include: local and remote files, databases, and remote procedure call (RPC) servers. While some resources may be used for both production and test systems, some resources are environment-specific. An example framework should use the same type of resources in testing as in production to verify that the release program is working correctly. Since not all production resources may be available in a testing environment, an example framework may change resource labels within a release program to create relative paths to resources. This change may automatically replicate the runtime instance of the release program for testing purposes using non-production data. In order to create a relative path to resources, a prefix and/or postfix may be specified for the label of each resource. For example, a resource may be a file that is specified by a particular path. The file's path may be specified by a base directory followed by the type of resource, and then the date of the run:"/basedir/resource_type/run_date_dirpath." The resource type may be specified by a flag, resource_type, that determines what type of resource should be used. If the release program is running in a test environment, resource_type may be set to "test" whereas if the release program is running in a production environment resource_type may be set to "prod." The "run_date_dirpath" may be a global variable that is set to the current date. The prefix or postfix information may be skipped if it is not necessary for a resource. Any problems found by running this end to end validation framework may be fixed before an actual release date.

Another example validation technique may perform fault injection testing to emulate transient infrastructure failures and validate the provided error detection or recovery techniques. For example, infrastructure such as a database may become unavailable during a release program execution. To emulate infrastructure failures, faults may be injected into components of the release program. In order to perform a fault injection experiment, fault injection targets, fault type, and fault injection times need to be defined. An example framework may use call counts of a target function to determine the injection time. Alternatively, or additionally, an example framework may use the caller symbol name to determine the injection time.

Fault injection targets are a list of target class methods which may include constructors and their target states (e.g., arguments, body, and return value). When the target is a return value, the supported fault types include: SET (to return a specific value), SET without call, XOR (for bit flip errors), AND (for stuck-at-0 errors), OR (for stuck-at-1 errors), and raise exception where some types need extra argument for the value or bitmask. When the target is an argument, the supported fault types include SET, XOR, AND, OR, or a custom function which generates the value of a target argument at runtime. When the target is a method body, the supported fault types include delay, which is an extra delay. Injecting faults into preselected locations may allow error detection and recovery capabilities of release programs to be tested. Additionally, newly written release programs may use pre-identified fault injection locations and conduct fault injection tests. Injection may be done when starting a release program or after starting the release program. This injection may override specified target functions at runtime (using Python for example) to wrap the injection target function and perform the injection transparently.

An example framework may send emails regarding results of running the fault-tolerant software release automation. Emails may include messages such as alert receivers to release statuses, and summaries of releases and/or validations.

Figure 6:
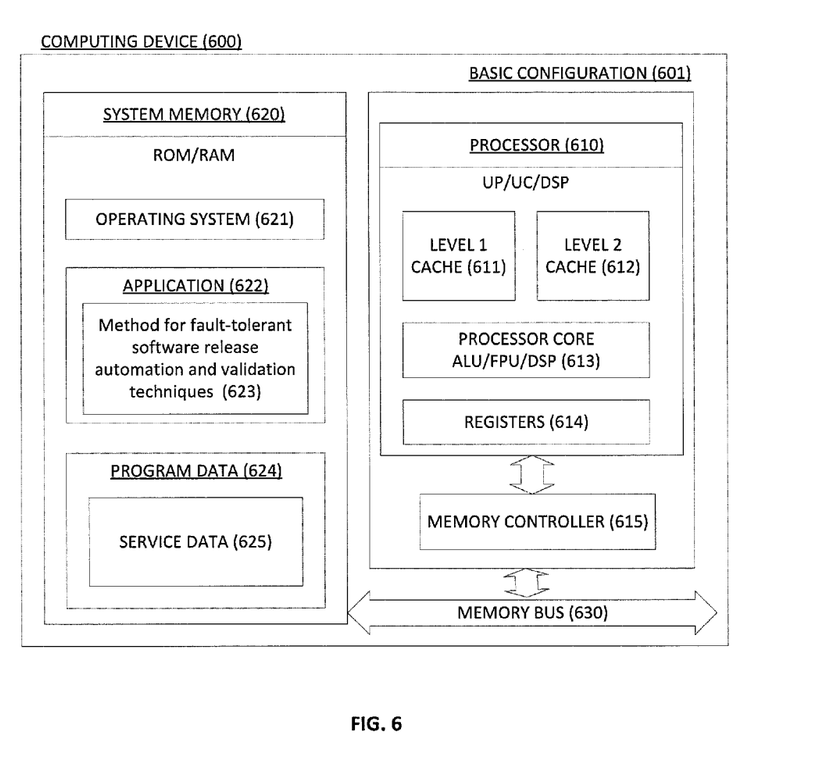
FIG. 6 is a block diagram illustrating an exemplary computing device.

FIG. 6 is a high-level block diagram of an example computer (600) that is arranged for creating fault-tolerant release automation programs and providing validation techniques. In a very basic configuration (601), the computing device (600) typically includes one or more processors (610) and system memory (620). A memory bus (630) can be used for communicating between the processor (610) and the system memory (620).

Depending on the desired configuration, the processor (610) can be of any type including but not limited to a microprocessor (µP), a microcontroller (µC), a digital signal processor (DSP), or any combination thereof. The processor (610) can include one more levels of caching, such as a level one cache (611) and a level two cache (612), a processor core (613), and registers (614). The processor core (613) can include an arithmetic logic unit (ALU), a floating point unit (FPU), a digital signal processing core (DSP Core), or any combination thereof. A memory controller (616) can also be used with the processor (610), or in some implementations the memory controller (615) can be an internal part of the processor (610).

Depending on the desired configuration, the system memory (620) can be of any type including but not limited to volatile memory (such as RAM), non-volatile memory (such as ROM, flash memory, etc.) or any combination thereof. System memory (620) typically includes an operating system (621), one or more applications (622), and program data (624). The application (622) may include a method for fault-tolerant release automation and validation techniques. Program Data (624) includes storing instructions that, when executed by the one or more processing devices, implement a method for automated, fault-tolerant software release. (623). In some embodiments, the application (622) can be arranged to operate with program data (624) on an operating system (621)

The computing device (600) can have additional features or functionality, and additional interfaces to facilitate communications between the basic configuration (601) and any required devices and interfaces.

System memory (620) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media can be part of the device (600).

The computing device (600) can be implemented as a portion of a small-form factor portable (or mobile) electronic device such as a cell phone, a smartphone, a personal data assistant (PDA), a personal media player device, a tablet computer (tablet), a wireless web-watch device, a personal headset device, an application-specific device, or a hybrid device that include any of the above functions. The computing device (600) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), other integrated formats, or as a web service. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., fiber optics cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for fault-tolerant software release automation, the method comprises:
   identifying a set of software release procedures;
   modeling, using a fault-tolerant release automation library, the set of software release procedures and their dependencies into a nested directed graph of workflow components, where at least one component represents at least one software release procedure from the set of software release procedures;
   creating a release program using the modeled software release procedures;
   running an end to end test of the release program to verify configuration files used in a release;
   changing resource labels within the release program for production resources not available in a testing environment to create relative paths;
   automatically replicating a runtime instance for testing purposes using non-production data using the relative paths created by the changed resource labels, the changed resource labels including prefix or postfix labels, and
   running the created release program, wherein each workflow component includes at least one operation performed by the release program,
   wherein the nested directed graph includes a plurality of vertices and directed arcs, each vertex corresponding to a workflow component and each directed arc representing a workflow component's conditional dependency of one or more preceding workflow components having successfully completed, where the conditional dependencies include both AND and OR conditions.

2. The method of claim 1, further comprising running a validation technique to verify the release program.

3. The method of claim 2, wherein a validation technique is an end to end test of the release program to verify configuration files used in a release.

4. The method of claim 2, wherein a validation technique is fault injection testing comprising:
   selecting at least one location in a release program where infrastructure failure can occur;
   determining the time of injection;
   injecting at least one fault into the selected location at the determined time;
   running the release program with the injected fault; and
   identifying parts of the release program not covered by the release program's error recovery procedures.

5. The method of claim 1, further comprising sending email regarding the created release program's execution.

6. The method of claim 4, wherein the injected fault includes an injection target, a fault type, and a fault injection time.

7. The method of claim 1, further comprising:
   running a validation technique to verify the release program, wherein the validation technique incrementally validates by only validating newly added components.

8. The method of claim 1, further comprising:
   verifying the workflow using the nested directed graph of workflow components.

9. The method of claim 1, wherein each component further comprises: a preset, a validation, and a post handler.

10. The method of claim 1, wherein at least one of the components represents an error recovery process for another component within the set.

11. The method of claim 1, wherein error checking is run concurrently among components that are not dependent upon one another.

12. The method of claim 8, wherein verifying the workflow includes:
   traversing the possible execution paths of the workflow; and
   determining whether input arguments have been set for each component.

13. The method of claim 8, wherein verifying the workflow includes:
   determining whether failure of any one component results in a single point of failure for the workflow.

14. A system for fault-tolerant software release automation, the system comprising:

one or more processing devices and one or more storage devices storing instructions that, when executed by the one or more processing devices, cause the one or more processing devices to:

identify a set of software release procedures;

model, using a fault-tolerant release automation library, the set of software release procedures and their dependencies into a nested directed graph of workflow components, where at least one component represents at least one software release procedure from the set of software release procedures;

create a release program using the modeled software release procedures;

running an end to end test of the release program to verify configuration files used in a release;

changing resource labels within the release program for production resources not available in a testing environment to create relative paths;

automatically replicating a runtime instance for testing purposes using non-production data using the relative paths created by the changed resource labels, the changed resource labels including prefix or postfix labels, and running the created release program, wherein each workflow component includes at least one operation performed by the release program, wherein the nested directed graph includes a plurality of vertices and directed arcs, each vertex corresponding to a workflow component and each directed arc representing a workflow component's conditional dependency of one or more preceding workflow components having successfully completed, where the conditional dependencies include both AND and OR conditions.

15. The system of claim 14, further comprising running a validation technique to verify the release program.

16. The system of claim 15, wherein a validation technique is an end to end test of the release program to verify configuration files used in a release.

17. The system of claim 15, wherein a validation technique is fault injection testing comprising:

selecting at least one location in a release program where infrastructure failure can occur;

determining the time of injection;

injecting at least one fault into the selected location at the determined time;

running the release program with the injected fault; and identifying parts of the release program not covered by the release program's error recovery procedures.

18. The system of claim 14, further comprising sending email regarding the created release program's execution.

19. The system of claim 17, wherein the injected fault includes an injection target, a fault type, and a fault injection time.

20. The system of claim 14, further comprising:

running a validation technique to verify the release program, wherein the validation technique incrementally validates by only validating newly added components.

21. The system of claim 14, further comprising:

verifying the workflow using the nested directed graph of workflow components.

22. The system of claim 14, wherein each component further comprises: a preset, a validation, and a post handler.

23. The system of claim 14, wherein at least one of the components represents an error recovery process for another component within the set.

24. The system of claim 14, wherein error checking is run concurrently among components that are not dependent upon one another.

25. The system of claim 21, wherein verifying the workflow includes:

traversing the possible execution paths of the workflow; and determining whether input arguments have been set for each component.

26. The system of claim 21, wherein verifying the workflow includes:

determining whether failure of any one component results in a single point of failure for the workflow.

* * * * *